July 25, 1967 P. J. TAMMINEN 3,332,803
SPIN ACTIVATED BATTERY
Filed March 24, 1964

United States Patent Office 3,332,803
Patented July 25, 1967

3,332,803
SPIN ACTIVATED BATTERY
Pentti Juuse Tamminen, Otakallio, Otaniemi, Finland
Filed Mar. 24, 1964, Ser. No. 354,266
7 Claims. (Cl. 136—90)

This invention refers to a deferred action battery, such as used in projectiles having a proximity fuse.

The introduction of transistors in such devices has caused a need for batteries having a lower voltage than earlier battery types used in connection with radio valves, but a higher current capability and a higher voltage stability throughout the required temperature range.

It is an object of the present invention to provide a spin activated battery with an improved current capability and voltage stability over a temperature range of −60° C. to +75° C.

Another object of this invention is to provide a new, simple battery construction including a large area electrodes, and making possible a reliable and effective filling of all cells of the battery with electrolyte in a minimum of time.

Figure 1:
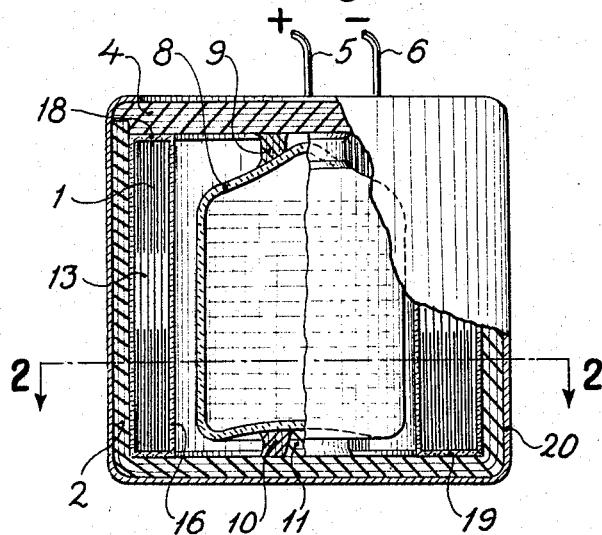
Figure 3:
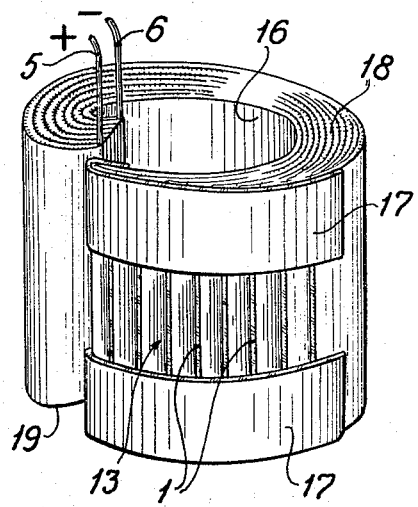
Figure 2:
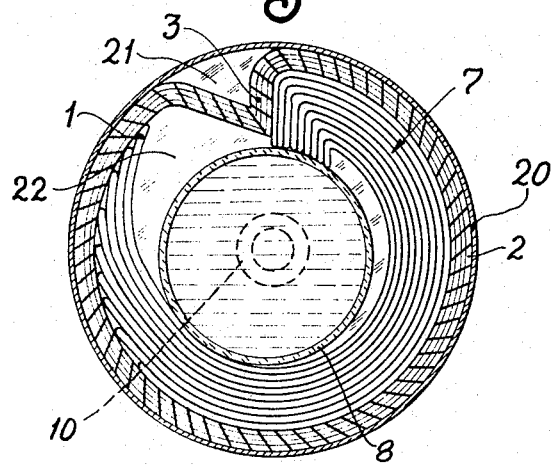
Figure 4:
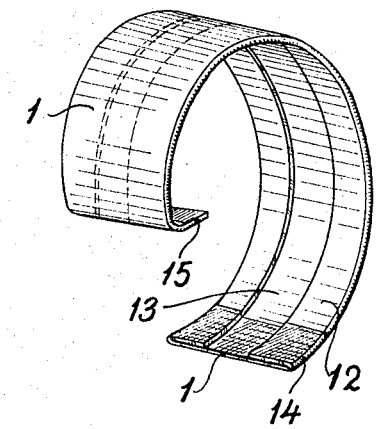
Figure 5:
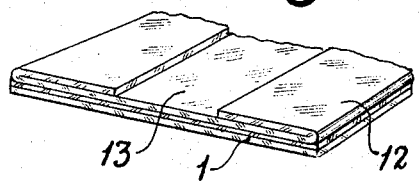

These and other objects of the invention are achieved by using principally the electro-chemical system zinc/hydrochloric acid/manganese dioxide+carbon, and a battery construction according to the accompanying drawings, in which FIGURE 1 shows a front elevation partially broken away to show cross-sectional views of the spin activated battery, FIGURE 2 shows a horizontal sectional view through the battery as indicated by the arrows 2—2 of FIG. 1, FIGURE 3 shows a perspective view of the cell-pack, FIGURE 4 shows a perspective view of a duplex electrode, and FIGURE 5 shows an enlarged perspective view illustrating the construction of an electrode according to FIG. 4.

In the preferred embodiment of the invention shown in the drawings, a cylindrical battery unit 7 (FIG. 2) is constructed by bending a number of rectangular electrode plates 1 to form a tubular ring tightly fitting into a cylindrical plastic container 2. The other vertical ends of said electrode plates are spaced along the periphery of the container, and the opposite ends are bent sharply inwards so that their distance from the container wall is about equal and somewhat above the electrolyte level of an activated battery under spin conditions. In the cylindrical container wall there is a ridge 3 (FIG. 2), parallel to the axis of the cylinder, supporting the angular electrode ends and extending above the electrolyte level when the battery is activated.

The container 2 is tightly sealed with a lid 4, which is provided with at least two small holes for terminal wires 5 and 6. After assembling said wires the holes are preferably caulked with plastic cement so that the battery becomes hermetically closed.

The electrolyte is sealed within a frangible ampule 8 which is positioned in the center of the container 2 between two rubber rings 9 and 10. The cell-pack 7 acts as horizontal shock absorber. Elevation 11 at the bottom of the container helps to shatter the ampule at set-back shock, when the projectile containing the battery is fired.

The electrolyte composition is preferably following:

| | Parts |
|---|---|
| 25% HCl | 100 |
| LiCl | 10 |
| $HgCl_2$ | 0.15 |

The rectangular electrode plates are cut from a zinc sheet on one side of which a flexible cathode layer may be formed as follows:

As a priming coat, three layers of the following paint are applied with a spray gun:

| | Parts |
|---|---|
| Graphite (200 mesh) | 2 |
| Acetylene black | 1 |
| Polyisobutylene (medium grade) | 1 |
| Chlorothene | 30 |

As a finishing coat, three layers of the following paint are applied with a spray gun:

| | Parts |
|---|---|
| Electrolytic manganese dioxide | 100 |
| Graphite (200 mesh) | 10 |
| Acetylene black | 5 |
| Polyisobutylene (medium grade) | 10 |
| Chlorothene | 300 |

Each coat is left to dry for about 5 minutes. The finishing layers are preferably sprayed from a longer distance than the priming layers, so that the cathode surface becomes somewhat rough and porous.

This method of preparing the cathode layer is most economical and suitable for mass production of the battery plates. Upon evaporation of chlorothene, a porous surface layer containing carbon and manganese dioxide is formed. The coating is flexible, which makes possible to bend the electrode plates as mentioned above. When this layer is wetted with the electrolyte containing HCl, as a result of reaction between HCl and $MnO_2$ free chlorine is formed, essentially improving the depolarization. With a zinc anode, the closed circuit voltage of such cell is about 2.0 volts at −60° C. and about 2.4 volts at +75° C., with a current drain of 1 ma./cm.² Because of improved depolarization of the cathode and good conductivity of the electrolyte, the internal resistance of the cell is relatively small, making high current densities possible.

Instead of zinc, magnesium or aluminium or alloys comprising at least two of the metals zinc, magnesium and aluminium in various combinations can be used as electrode material.

The battery unit 7 is assembled of the described bipolar electrode plates, separated from each other with porous sheets of e.g. filter paper. As shown in FIGURES 4 and 5, the separator sheets 12 are about the same length as the electrode plates 1, but about 70% wider. The excess of width is folded about the electrode plates so that a slot 13 is formed in the middle, facilitating the filling of the cells in the assembled battery. Before forming the electrode plate assembly or pack, the ends of the electrode plates are dipped in insulating plastic compound, such as a vinyl chloride-acetate copolymer dissolved in acetone, the outer ends 14 being dipped to a depth of about 10 mm., and the angular ends 15 to a depth of about 5 mm. The outer ends of the separators are dipped in similar way.

The electrode pack 7 is preferably formed by first bending the angular ends of the thus insulated electrode plates individually, then stacking the insulated plates on each other with the plates oriented in the same manner, and bending the whole stack to substantially cylindrical form with a special tool. The innermost electrode is of plain zinc, covered with an insulating plastic layer 16 on the inner side. The outer ends of the electrodes are fastened with tapes 17 (FIG. 3), between which a common filling slot of the cells is formed. Terminal wires 5 and 6 are soldered at the angular ends of the electrodes. Before assembling the cell pack 7 into the container 2, both of its ends 18 and 19 are covered with an insulating plastic layer, e.g. such as applied at the ends of electrode plates.

The zinc side of the outer electrode is preferably also covered with an insulating paint layer.

The battery is finally provided with a metal jacket 20. The recess 21 in the wall of the plastic container 2 is adapted for connection wires leading to the battery contacts.

When the battery is activated by set-back shock and spin, the glass ampule 8 is shattered and the electrolyte is thrown by centrifugal force against the walls of the inner space of the battery. The triangular space 22 is thus filled with electrolyte, and the angular ends of the electrodes are only just above the initial electrolyte level. Yet because of the high pressure caused by the centrifugal force, all cells of the battery are rapidly and smoothly filled with electrolyte through slots 13, the air having a free escape path from the angular ends of the cells. Thus with the battery of the present invention there is no counterflow of air bubbles and electrolyte; such counterflow is the main reason for harmful noise voltages in several previously known spin activated battery types.

While there has been described what at present is considered to be a preferred embodiment of the invention, it will be obvious to those skilled in the art that various changes and modifications may be made therein without departing from the invention as defined in the appended claims.

The embodiments of the invention in which an exclusive property or privilege is claimed are defined as follows.

What I claim is:

1. A reserve type battery for projectiles capable of being activated by set-back shock and spin, comprising a closed cylindrical container, a substantially cylindrical electrode assembly within said container adjacent to the inner periphery thereof, said electrode assembly being formed of a stack of a plurality of substantially rectangular, bipolar electrode plates and separator sheets of non-conducting, porous material between each two electrode plates, the same one end of said electrode plates in said assembly being bent towards the center of said container, pairs of successive electrode plates and the separator sheet disposed therebetween providing slots disposed intermediate the axial width of the plate and extending longitudinally of the plates and peripherally of the assembly from the bent ends of the plates to the opposite ends thereof, said slots providing for the introduction of electrolyte between, and the escape of air from between, the respective pair of plates and the separator sheet therebetween, an insulating layer substantially covering the outer surfaces of said assembly, a frangible ampule filled with electrolyte positioned in the center of said container, and means for breaking said ampule by set-back shock.

2. A battery as in claim 1, said container having an inwardly protruding wall positioned adjacent said bent ends of said electrodes, said inwardly protruding wall forming an insulating barrier between the opposite ends of said electrode plates for preventing short circuiting between said opposite ends of the electrode plates in the activated state of said battery.

3. A battery as in claim 1, wherein said separator sheets consist of porous paper.

4. A battery as in claim 1, comprising an insulating plastic layer covering the opposite ends of said electrode plates and said separator sheets at said slots.

5. A battery as in claim 1, wherein the cathodic material of said bipolar electrodes is a porous mixture of carbon, manganese dioxide and a binder material, and the anodic material of said electrode plates is selected from a group of metals consisting of zinc, magnesium, aluminium and an alloy comprising at least two of the metals zinc, magnesium and aluminium and said electrolyte includes hydrochloric acid at a concentration of about 25%.

6. A battery as in claim 1, wherein said slots are disposed substantially along the axially middle portion of the electrode plates.

7. A reserve type battery for projectiles capable of being activated by set-back shock and spin, comprising a closed cylindrical container, a substantially cylindrical battery assembly within said container adjacent to the inner periphery thereof, said assembly being formed of a stack of a plurality of substantially rectangular, bipolar electrode plates and separator sheets of non-conducting, porous material between each pair of two successive electrode plates, the same one end of each of said electrode plates being bent towards the center of said container along a line substantially parallel to the axis of the container, said container having an axially extending ridge in the inner periphery thereof, said ridge having a first steep side adjacent to which said bent ends of the electrodes forming said electrode assembly is situated and a second sloping side facing the opposite end of the electrode assembly, pairs of successive electrode plates and the separator sheet disposed therebetween providing slots for the introduction of electrolyte between, and the escape of air from between, the respective pair of plates and the separator sheet therebetween, said slots extending substantially along the middle of the electrode plates in the longitudinal direction thereof from said bent ends to said opposite ends, an insulating layer substantially covering the outer surface of said assembly, a frangible ampule filled with electrolyte positioned in the center of said container, and means for breaking said ampule by set-back shock.

References Cited

UNITED STATES PATENTS

| | | | |
|---|---|---|---|
| 2,902,531 | 9/1959 | Feinleib et al. | 136—90 |
| 2,981,780 | 4/1961 | Burnette | 136—90 |
| 3,003,016 | 10/1961 | Marsal | 136—90 |
| 3,156,588 | 11/1964 | Darland | 136—90 X |

WINSTON A. DOUGLAS, *Primary Examiner.*

B. J. OHLENDORF, A. SKAPARS, *Assistant Examiners.*